E. J. MAUS.
ARTIFICIAL BAIT.
APPLICATION FILED JAN. 23, 1914.
1,109,439.
Patented Sept. 1, 1914.
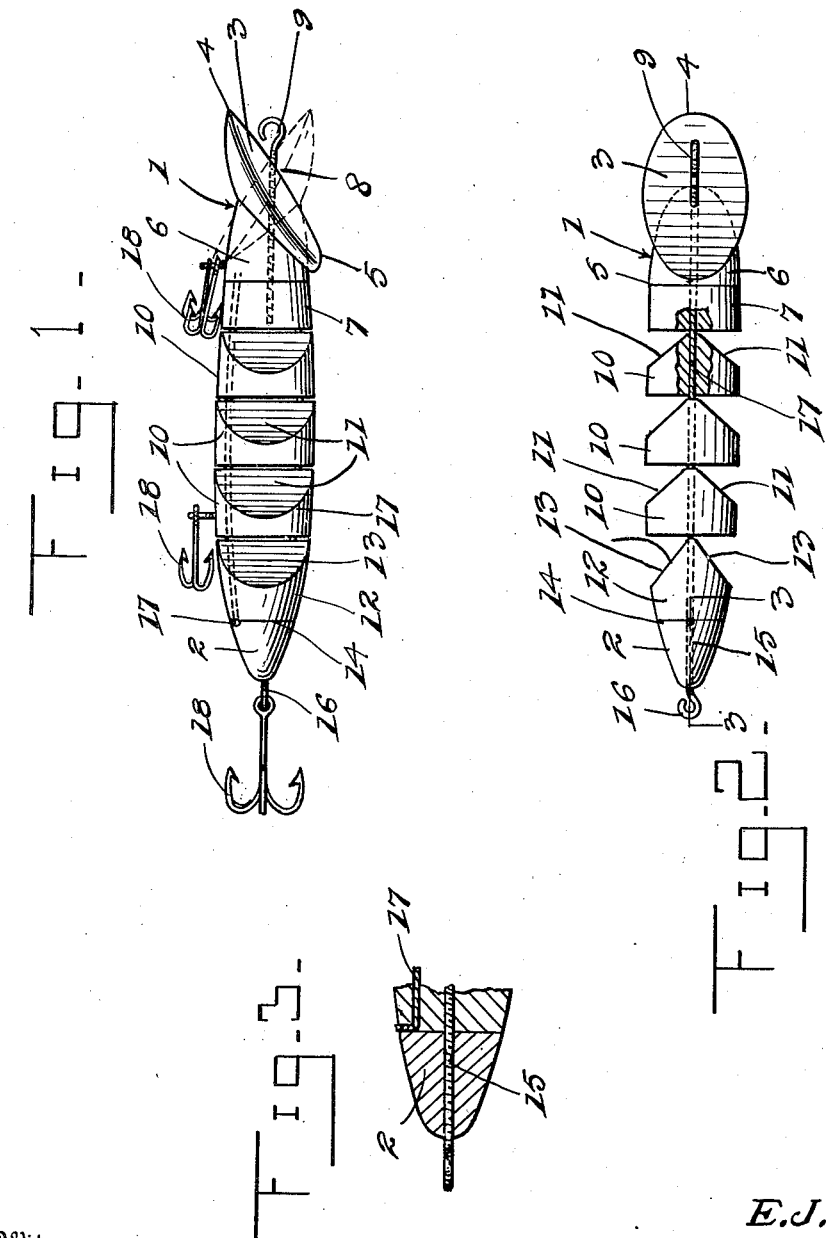
Witnesses
Inventor
E. J. Maus.

UNITED STATES PATENT OFFICE.

EDWARD J. MAUS, OF JOLIET, ILLINOIS.

ARTIFICIAL BAIT.

1,109,439.  Specification of Letters Patent.  Patented Sept. 1, 1914.

Application filed January 23, 1914. Serial No. 813,925.

*To all whom it may concern:*

Be it known that I, EDWARD JOSEPH MAUS, a citizen of the United States, residing at Joliet, in the county of Will and State of Illinois, have invented certain new and useful Improvements in Artificial Bait; and I do hereby declare the following to be a full, clear, and exact description of the invention, such as will enable others skilled in the art to which it appertains to make and use the same.

This invention relates to artificial minnows, and one of the principal objects of the invention is to provide an artificial minnow which will dive, swim under water, and will float on the water, whenever required, and will make all the movements of a live minnow when properly manipulated by the reel or fishing rod.

Another object of the invention is to provide an artificial minnow made up of articulated sections and provided with a head having an oblique or inclined concave front surface, said head being pivoted to the body of the minnow so that it may be reversed for converting the minnow into a diving or a floating minnow.

Still another object of the invention is to provide an artificial minnow comprising a number of sections connected together by a flexible cord which may be renewed whenever desired or whenever the cord becomes injured or broken.

These and other objects may be attained by means of the construction illustrated in the accompanying drawing, in which, Figure 1 is a side elevation of an artificial minnow made in accordance with this invention, the head of the minnow being shown in full lines in one position and in dotted lines in the other position. Fig. 2 is a plan view of the same with a portion broken away to illustrate the cord for hinging the sections of the body portion, and Fig. 3 is a detail sectional view taken on the line 3—3 of Fig. 2.

Referring to the drawing, the numeral 1 designates the head member of the minnow as an entirety, and 2 is the tail member thereof. The head member 1 is provided with a concave, oblique or inclined front surface 3, having a curved sharp edge 4, and a somewhat curved and flattened edge 5.

Formed integral with the head portion, is a neck or extension 6, which is substantially circular in cross section, and connected to the rear end of the extension 6 is a block or member 7. The head 1 is connected to the member 7 by a screw-threaded hook shank 8 which extends longitudinally through the head and into said member 7. The hook portion 9 is for the attachment of the fishing line. The articulated sections 10 of the body of the minnow are provided with diverging front surfaces 11. The tail member 12 is provided with diverging front surfaces 13 and a plane somewhat circular rear face 14. The tail 2 is connected to the member 12 by a screw threaded shank 15 having an eye 16 formed on its outer end. The cords 17 for connecting the articulated members of the minnow together, extend through the members and the ends of the cords are connected to the head member 1 at one of their ends and to the tail member 2 at their other ends. These cords may be withdrawn upon removing the head and tail members, and a new cord or cords inserted in their place. The hooks 18 may be connected in any suitable manner to the various sections or parts of the minnow.

The artificial minnow may be made of wood or any suitable material of sufficient buoyancy and may be painted to represent a minnow of any desired character.

From the foregoing it will be obvious that when the head member 1 is disposed in the position shown in full lines in Fig. 1, and the minnow is properly manipulated by the rod or reel, the minnow will have a tendency to float on the water owing to the inclined surface 3 for the impact of the water. When the head member is rotated upon the screw threaded shank 8 to the position shown in dotted lines in Fig. 1, and when the line is pulled the fish or minnow will dive and continue in an inclined course through the water owing to the position of the surface 3 of the head and the impact of the water thereon. The hooks shown in Fig. 1 at the top of the artificial minnow may be connected at the bottom of the device or at any other suitable point without interfering with the operation of the minnow. In all the movements of the artificial minnow, the movements of the articulated members 10 will simulate the natural movements of a minnow.

Various changes may be made in the details of construction without departing from the spirit and scope of the invention as defined in the claims.

What is claimed is:—

1. An artificial minnow provided with a pivoted and adjustable head, said head having an inclined and concave front surface, a plurality of sections having cut-away portions providing diverging side surfaces, said sections and head being connected together by means of a cord extending through the sections and connected to the head and tail members of the minnow.

2. An artificial minnow comprising a series of sections connected together by a flexible cord, said sections being cut away at their opposite sides to permit the minnow to articulate in the water, said minnow having a head portion pivoted on a longitudinally disposed pin and provided with an inclined and concave front surface, said head member being reversible to dive or float, and a tail member provided with converging side surfaces and a threaded rod extending into the tail section and provided with a loop for the connection of a duplex hook.

In testimony whereof I affix my signature in presence of two witnesses.

EDWARD J. MAUS.

Witnesses:
 MARGARET NELSON,
 ANNA NELSON.